(12) United States Patent
Pacheri

(10) Patent No.: US 9,545,671 B2
(45) Date of Patent: Jan. 17, 2017

(54) CUTTING INSERT WITH SCALLOPS

(71) Applicant: Kennametal India Limited, Bangalore (IN)

(72) Inventor: Sreekala Pacheri, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 237 days.

(21) Appl. No.: 14/094,836

(22) Filed: Dec. 3, 2013

(65) Prior Publication Data

US 2014/0154019 A1    Jun. 5, 2014

(30) Foreign Application Priority Data

Dec. 4, 2012 (IN) .......................... 5053/CHE/2012

(51) Int. Cl.
| B23C 5/20 | (2006.01) |
| B23B 27/14 | (2006.01) |
| B23B 27/16 | (2006.01) |

(52) U.S. Cl.
CPC ...... B23B 27/143 (2013.01); *B23B 2200/0447* (2013.01); *Y10T 407/235* (2015.01)

(58) Field of Classification Search
CPC .............. B23B 27/143; B23B 2200/202; Y10T 407/235
See application file for complete search history.

(56) References Cited

U.S. PATENT DOCUMENTS

| 4,626,140 | A |   | 12/1986 | Zweekly et al. |               |
|-----------|---|---|---------|----------------|---------------|
| 4,705,434 | A | * | 11/1987 | Patterson      | B23B 27/143   |
|           |   |   |         |                | 407/114       |
| 4,787,784 | A | * | 11/1988 | Bernadic       | B23B 27/143   |
|           |   |   |         |                | 407/114       |
| 5,249,894 | A | * | 10/1993 | Bernadic       | B23B 27/143   |
|           |   |   |         |                | 407/114       |
| 5,584,616 | A | * | 12/1996 | Katbi          | B23B 27/143   |
|           |   |   |         |                | 407/114       |
| 8,727,676 | B2| * | 5/2014  | Lof            | B23B 27/143   |
|           |   |   |         |                | 407/113       |

* cited by examiner

*Primary Examiner* — Will Fridie, Jr.
(74) *Attorney, Agent, or Firm* — Ian K. Samways

(57) ABSTRACT

A polygonal indexable cutting insert including a pair of faces, a plurality of peripheral side surfaces, a plurality of rounded corners, a plurality of cutting edges formed with an edge radius, a plurality of triangular-shaped areas proximate the rounded corners; and a plurality of chip breaking scallops positioned along the cutting edges. Each scallop has a bottom surface formed by a rake face and an arcuate back wall having a varying depth. The arcuate back wall of each scallop intersects the arcuate back wall of adjacent scallops at a point located at a distance from each cutting edge for providing a wedge effect that facilitates in dividing and breaking chips.

19 Claims, 3 Drawing Sheets

CUTTING INSERT WITH SCALLOPS

CLAIM TO PRIORITY

This application is a National entry application of Indian Application No. 5053/CHE/2012, filed on Dec. 4, 2012, the entire contents of which is incorporated herein by reference.

FIELD OF THE INVENTION

The invention relates in general to a cutting insert that may be detachably mounted on a tool holder for cutting a work piece, and in particular to a cutting insert for performing a turning operation on a work piece made of titanium and the like.

BACKGROUND OF THE INVENTION

In normal titanium turning, heat generation at the interface between the tool and the workpiece is a detrimental factor in tool life. The problem is to identify a geometry of the cutting edge that lowers temperatures during a machining operation.

SUMMARY OF THE INVENTION

The problem of excessive heat generation at the interface between the tool and the workpiece is solved by providing a cutting edge with an edge radius with a radius up to 0.02 mm and a rake face extending inwardly and downwardly at an angle of up to 12 degrees with respect to a plane parallel to the face to help in smooth movement of the chip.

In one aspect of the invention, a polygonal indexable cutting insert comprises a pair of faces and a plurality of peripheral side surfaces normal to said parallel faces, said faces and said side surfaces being joined to form rounded corners, each face having a rake face and a central plateau; a plurality of cutting edges formed at an intersection between said faces and plurality of side surfaces; and a plurality of chip breaking scallops positioned along the cutting edges, each scallop comprises a bottom surface formed by the rake face and an arcuate back wall joining said bottom surface and said central plateau to form a chip breaker, wherein said central plateau of each face includes a triangular-shaped area including an apex that lies along a bisector passing through a central axis and opposite rounded corners.

In another aspect of the invention, a polygonal indexable cutting insert comprises a pair of faces and a plurality of peripheral side surfaces normal to said parallel faces, said faces and said side surfaces being joined to form rounded corners, each face having a central plateau that includes a triangular-shaped area proximate each rounded corner; a plurality of cutting edges formed at an intersection between said faces and plurality of side surfaces, each cutting edge formed with an edge radius; a rake face extending inwardly and downwardly at an angle with respect to a plane that is parallel to the pair of faces; and a plurality of chip breaking scallops positioned along the cutting edges comprising a bottom surface formed by the rake face and an arcuate back wall joining said bottom surface and said central plateau to form a chip breaker, wherein a depth of the arcuate back wall of each scallop varies, thereby increasing side curl of the chips and formation of short helical chips.

In another aspect of the invention, a polygonal indexable cutting insert comprises a pair of faces and a plurality of peripheral side surfaces normal to said parallel faces, said faces and said side surfaces being joined to form rounded corners, each face having a central plateau that includes a triangular-shaped area proximate each rounded corner; a plurality of cutting edges formed at an intersection between said faces and plurality of side surfaces, each cutting edge formed with an edge radius; a rake face extending inwardly and downwardly at an angle with respect to a plane that is parallel to the pair of faces; a triangular-shaped area proximate the rounded corners, each triangular-shaped area including an apex that lies along a bisector passing through a central axis and opposite rounded corners; and a plurality of chip breaking scallops positioned along the cutting edges comprising a bottom surface formed by the rake face and an arcuate back wall joining said bottom surface and said central plateau to form a chip breaker, wherein the arcuate back wall of each scallop intersects the arcuate back wall of adjacent scallops at a point located at a distance from each cutting edge for providing a wedge effect that facilitates in dividing and breaking chips, and wherein a depth of the arcuate back wall of each scallop is smallest proximate the point and largest between adjacent points, thereby increasing side curl of the chips and formation of short helical chips.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
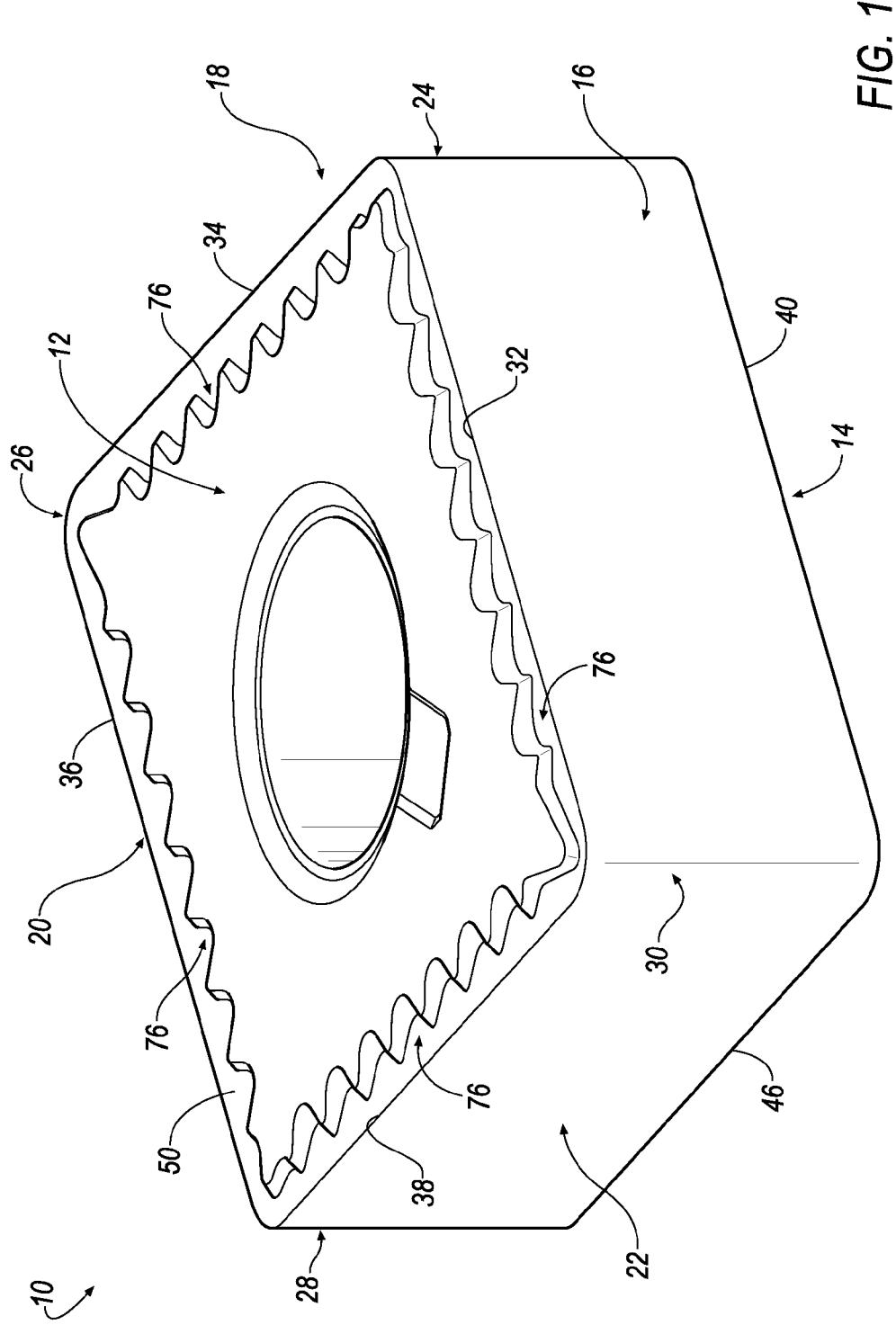
FIG. 1 shows a perspective view of an indexable cutting insert with scallops according to an embodiment of the invention.

Referring now to FIG. 1, an indexable cutting insert 10 is shown according to an embodiment of the invention. In general, the cutting insert 10 is generally diamond in shape having substantially parallel faces 12, 14 and peripheral side surfaces 16, 18, 20, 22 that are substantially normal to the parallel faces 12, 14. The cutting insert 10 also has four rounded corners 24, 26, 28, 30 extending between the parallel faces 12, 14. Because of the symmetry of the cutting insert 10, it will be appreciated that corners 24 and 28 are substantially identical to each other, and that corners 26 and 30 are substantially identical to each other.

A plurality of cutting edges 32, 34, 36, 38 are formed at the intersection between the face 12 and the side surfaces 16, 18, 20, 22. Similarly, a plurality of cutting edges 40, 42, 44, 46 are formed at the intersection between the face 12 and the side surfaces 16, 18, 20, 22 (cutting edges 42, 44 are not visible in FIG. 1). In the illustrated embodiment, the cutting edges 32, 36 are substantially parallel to each other, while the cutting edges 34, 38 are substantially parallel to each other. It will be appreciated that a generally diamond-shaped cutting insert is illustrated, the principles of the invention described below can be applied to a cutting insert having any polygonal shape.

Figure 2:
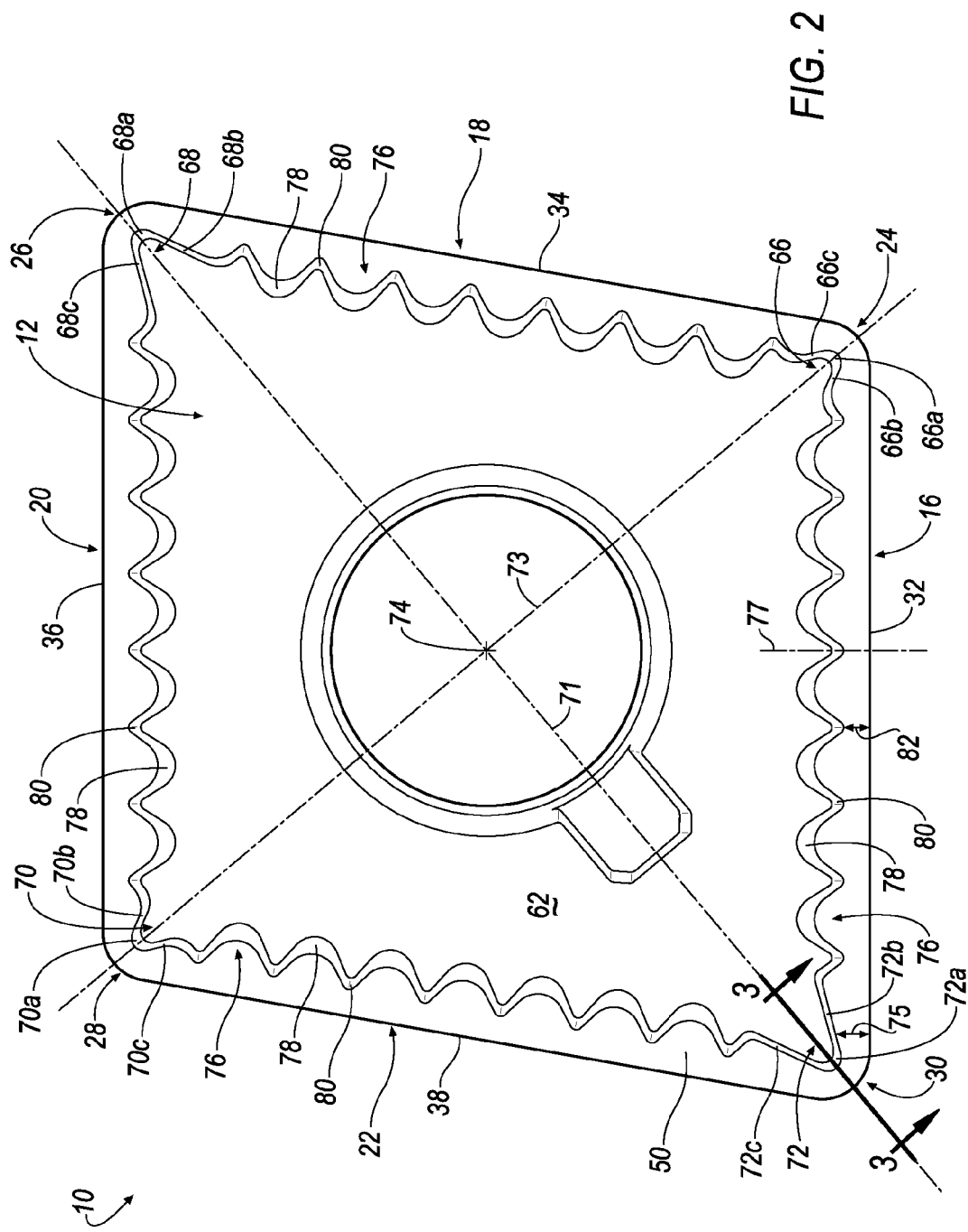
FIG. 2 shows a top view of the indexable cutting insert of FIG. 1.
Figure 3:
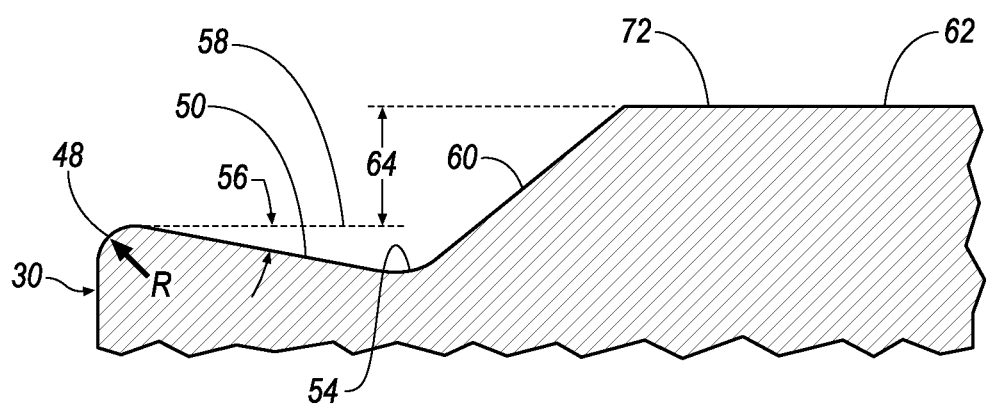
FIG. 3 shows a cross-sectional view of the cutting insert taken along line 3-3 of FIG. 2.

Referring now to FIGS. 2 and 3, the intersection between each rounded corner 24, 26, 28, 30 and the parallel faces 12, 14 is formed with an edge radius 48 having a radius, R. Similarly, the cutting edges 32, 34, 36, 38 are formed with the edge radius 48. In one embodiment, the radius, R, is in a range between about 10 microns to about 20 microns (0.01-0.02 mm). In addition, each face 12, 14 has a rake face 50, 52, respectively, that extends entirely around the periphery of the cutting insert 10. As shown in FIG. 3, the rake face 50, 52 extends inwardly and downwardly from both the rounded corners 24, 26, 28, 30 and the cutting edges 40, 42, 44, 46 to a bottom 54 at an angle 56 with respect to a plane 58 parallel to the face 12, 14 (rake face 52 is not visible in FIGS. 2 and 3). In one embodiment, the angle 56 is in a range between about 10 degrees to about 12 degrees. An arcuate back wall 60 extends upwardly from the bottom 54 to a central, substantially planar plateau 62 of each face 12, 14 of the cutting insert 10. A difference in elevation between the central plateau 62 and the edge radius 48 defines a height 64. In one embodiment, the height 64 is in a range between about 0.08 mm to about 0.12 mm. The downward sloping rake face 50, 52 and upward sloping arcuate back wall 60 facilitate desired chip formation during a machining operation.

One aspect of the invention is that the central plateau 62 of each face 12, 14 includes a triangular-shaped area, shown generally at 66, 68, 70, 72, proximate each rounded corner 24, 26, 28, 30, respectively, of the cutting insert 10. Although not shown in FIG. 2, it is understood that the face 14 is identical to the face 12. Each triangular-shaped area 66, 68, 70, 72 includes an apex 66a, 68a, 70a, 72a and a pair of side walls 66b, 66c, 68b, 68c, 70b, 70c, 72b, 72c. In the illustrated embodiment, the apex 66a, 68a, 70a, 72a of the triangular-shaped area lie on a bisector passing through opposite rounded corners and through a central axis 74 of the cutting insert 10. For example, the apex 68a, 72a of the triangular-shaped areas 68, 72 proximate the opposite rounded corners 26, 30 lie on a bisector 71 passing through opposite rounded corners 26, 30 and the central axis 74. Similarly, the apex 66a, 70a of the triangular-shaped areas 66, 70 proximate the opposite rounded corners 24, 28 lie on a bisector 73 passing through opposite rounded corners 24, 28 and the central axis 74.

It is noted that a distance 75 from the sides of each triangular-shaped area 66, 68, 70, 72 to the cutting edge 32, 34, 36, 38 increases from the apex 66a, 68a, 70a, 72a. This varying distance produces the unexpected results that chips don't get over squeezed, and heat generation due to rubbing action is minimized. In addition, streaming of chips is such that the contact stresses are not concentrated near the cutting edge, but get distributed more evenly as compared to conventional cutting inserts. In addition, As a result, the peak stress and notching is reduced during a machining operation, thereby preventing the cutting insert 10 from premature failure.

Another aspect of the invention is that the cutting insert 10 includes a plurality of scallops, shown generally at 76, formed at particular locations along each cutting edge 32, 34, 36, 38 of the cutting insert 10. It is intended that the scallops 76 are similarly formed and the following description of a single scallop 76 is applicable to the formation of other scallops. The bottom surface of each scallop 76 is formed by the inward, downward sloping rake face 50, 52. As shown in FIG. 3, the rake face 50, 52 extends inwardly and downwardly from the cutting edges 40, 42, 44, 46 to the bottom 54 at the angle 56 with respect to the plane 58 parallel to the face 12, 14 (rake face 52 is not visible in FIGS. 2 and 3). In one embodiment, the angle 56 is in a range between about 10 degrees to about 12 degrees. In other words, the scallops 76 extend inwardly and downwardly with respect to each cutting edge 32, 34, 36, 38.

Each scallop 76 has an arcuate back wall 78 joining the bottom surface to form a chip breaker. Similar to the triangular-shaped area 66, 68, 70, 72, the arcuate back wall 78 of each scallop 76 extends upwardly from the bottom 54 to the central, substantially planar plateau 62 of each face 12, 14 of the cutting insert 10. The difference in elevation between the central plateau 62 and the edge radius 48 defines the height 64 in a range between about 0.08 mm to about 0.12 mm. The inward, downward sloping rake face 50, 52 and upward sloping arcuate back wall 78 facilitate desired chip formation during a machining operation.

In addition, the arcuate back wall 78 of each scallop 76 intersects the arcuate back wall 78 of adjacent scallops at a point 80 for providing a wedge effect that facilitates in dividing and breaking chips. It is noted that the point 80 at which the back wall 78 of each scallop 76 intersect one another is located at a distance 82 from each cutting edge 32, 34, 36, 38. In addition, a bisector 77 passing through the point 80 is substantially perpendicular to its respective proximate cutting edge 32, 34, 36, 38.

In the illustrated embodiment, the depth of the arcuate back wall 78 of each scallop 76 varies, thereby increasing side curl of the chips and formation of short helical chips. Specifically, the depth of the arcuate back wall 78 is smallest proximate the point 80 and is largest at a midway point between adjacent points 80. The varying depth provides the unexpected results that chips flow smoothly over the rake face 50, even at higher depth of cuts without exerting high pressures on the back wall 78. In addition, the varying depth of the back wall 78 helps in trapping any coolant, which aids in the removal of excess heat during a machining operation.

The form of a typical scallop 76 can be established on a master by a grinding wheel (not shown) as is known in the art. In one embodiment, the grinder includes a sixteen degree included angle conical form presented with its end surface at a twenty degree angle to the face 12, 14 of the cutting insert 10 providing a positive rake scallop face 50, 52 and a twenty-eight degree angle of the back wall 78 relative to the axis 74 of the cutting insert 10.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

PARTS LIST 10 cutting insert
12 face
14 face
16 side surface
18 side surface
20 side surface
22 side surface
24 rounded corner
26 rounded corner
28 rounded corner
30 rounded corner
32 cutting edge
34 cutting edge
36 cutting edge
38 cutting edge
40 cutting edge 42 cutting edge
44 cutting edge
46 cutting edge
48 edge radius
50 rake face
52 rake face
54 bottom
56 angle
58 plane
60 arcuate back wall
62 central plateau
64 height
66 triangular-shaped area
66a apex
66b side wall
66c side wall
68 triangular-shaped area
68a apex
68b side wall
68c side wall
70 triangular-shaped area
70a apex
70b side wall
70c side wall
71 bisector
72 triangular-shaped area
72a apex
72b side wall
72c side wall
73 bisector
74 central axis
76 scallop
78 arcuate back wall (scallop)
80 point

What is claimed is:

1. A polygonal indexable cutting insert, comprising:
a pair of faces and a plurality of peripheral side surfaces normal to said parallel faces, said faces and said side surfaces being joined to form rounded corners, each face having a rake face and a central plateau;
a plurality of cutting edges formed at intersections between said faces and said plurality of side surfaces;
wherein each said rake face slopes inwardly and downwardly from said cutting edges, via a single slope dimension; and
a plurality of chip breaking scallops positioned along said cutting edges, each said scallop comprising:
 a bottom surface formed by one of said rake faces; and
 an arcuate back wall joining said bottom surface and said central plateau;
wherein said central plateau of each face includes a triangular-shaped area proximate said rounded corners, each triangular-shaped area including an apex that lies along a bisector passing through a central axis and opposite rounded corners, each triangular-shaped area also including a pair of side walls; and
wherein a distance from each side wall of each of said triangular-shaped areas to a nearest cutting edge continuously increases from said apex;
each said side wall of each of said triangular-shaped areas terminating in a trough;
each said trough comprising a wall portion extending from a point furthest from a nearest cutting edge to a point intersecting said back wall of an adjacent scallop;
said point, at which said wall portion of each said trough intersects said back wall of an adjacent scallop, being disposed at a first distance from the nearest cutting edge;
said back wall of said adjacent scallop intersecting said back wall of another, adjoining scallop;
wherein a point at which said back wall of said adjacent scallop intersects said back wall of said other, adjoining scallop is located at a second distance from the nearest cutting edge;
said first distance being greater than or equal to said second distance.

2. The cutting insert according to claim 1, wherein the single slope dimension via which each said rake face slopes inwardly and downwardly with respect to said cutting edges is an angle in a range between 10 degrees to 12 degrees.

3. The cutting insert according to claim 1, wherein both said cutting edges and said rounded corners are formed with an edge radius having a radius, R, in a range between 0.01 mm to 0.02 mm.

4. The cutting insert according to claim 3, wherein a difference in elevation between said central plateau and said edge radius defines a height in a range between 0.08 mm to 0.12 mm.

5. The cutting insert according to claim 1, wherein a depth of said arcuate back wall of each scallop varies, thereby increasing side curl of the chips and formation of short helical chips.

6. The cutting insert according to claim 1, wherein said arcuate back wall of each scallop extends upwardly from a bottom to said central plateau.

7. The cutting insert according to claim 1, wherein said arcuate back wall of each scallop intersects said arcuate back wall of adjacent scallops at a point for providing a wedge effect that facilitates in dividing and breaking chips.

8. The cutting insert according to claim 7, wherein every point at which said back wall of each scallop intersects said back wall of an adjacent scallop is located at a distance from each cutting edge.

9. A polygonal indexable cutting insert, comprising:
a pair of faces and a plurality of peripheral side surfaces normal to said parallel faces, said faces and said side surfaces being joined to form rounded corners, each face having a central plateau that includes a triangular-shaped area proximate each said rounded corner, each triangular-shaped area including an apex and a pair of side walls;
a plurality of cutting edges formed at intersections between said faces and plurality of side surfaces, each cutting edge formed with an edge radius;
each face having a rake face which extends from each cutting edge inwardly and downwardly, via a single slope dimension, with respect to a plane that is parallel to said pair of faces; and
a plurality of chip breaking scallops positioned along said cutting edges, each said scallop comprising:
 a bottom surface formed by one of said rake faces; and
 an arcuate back wall joining said bottom surface and said central plateau;
wherein a depth of said arcuate back wall of each scallop varies, thereby increasing side curl of the chips and formation of short helical chips, and
wherein a distance from each side wall of each of said triangular-shaped areas to a nearest cutting edge continuously increases from said apex;
each said side wall of each of said triangular-shaped areas terminating in a trough;

each said trough comprising a wall portion extending from a point furthest from a nearest cutting edge to a point intersecting said back wall of an adjacent scallop;

said point, at which said wall portion of each said trough intersects said back wall of an adjacent scallop, being disposed at a first distance from the nearest cutting edge;

said back wall of said adjacent scallop intersecting said back wall of another, adjoining scallop;

wherein a point at which said back wall of said adjacent scallop intersects said back wall of said other, adjoining scallop is located at a second distance from the nearest cutting edge;

said first distance being greater than or equal to said second distance.

10. The cutting insert according to claim 9, wherein said apex of each triangular-shaped area lies along a bisector passing through a central axis and opposite rounded corners.

11. The cutting insert according to claim 9, wherein said arcuate back wall extends upwardly from a bottom to said central plateau.

12. The cutting insert according to claim 9, wherein a difference in elevation between said central plateau and said edge radius defines a height in a range between 0.08 mm to 0.12 mm.

13. The cutting insert according to claim 9, wherein said arcuate back wall of each scallop intersects said arcuate back wall of adjacent scallops at a point for providing a wedge effect that facilitates in dividing and breaking chips.

14. The cutting insert according to claim 13, wherein every point at which said back wall of each scallop intersects said back wall of an adjacent scallop is located at a distance from each cutting edge.

15. The cutting insert according to claim 9, wherein the depth of said arcuate back wall is smallest proximate said point and largest between adjacent points.

16. A polygonal indexable cutting insert, comprising:
a pair of faces and a plurality of peripheral side surfaces normal to said parallel faces, said faces and said side surfaces being joined to form rounded corners, each face having a central plateau that includes a triangular-shaped area proximate each rounded corner, each triangular-shaped area including an apex and a pair of side walls;
a plurality of cutting edges formed at intersections between said faces and plurality of side surfaces, each cutting edge formed with an edge radius;
each face having a rake face which extends from each cutting edge inwardly and downwardly, via a single slope dimension, with respect to a plane that is parallel to said pair of faces; and
a plurality of chip breaking scallops positioned along said cutting edges, each said scallop comprising:
a bottom surface formed by one of said rake faces; and
an arcuate back wall joining said bottom surface and said central plateau;
wherein said arcuate back wall of each scallop intersects said arcuate back wall of adjacent scallops at a point located at a distance from each cutting edge for providing a wedge effect that facilitates in dividing and breaking chips, and wherein a depth of said arcuate back wall of each scallop is smallest proximate said point and largest between adjacent points, thereby increasing side curl of the chips and formation of short helical chips, and
wherein a distance from each side wall of each of said triangular-shaped areas to a nearest cutting edge continuously increases from said apex;
each said side wall of each of said triangular-shaped areas terminating in a trough;
each said trough comprising a wall portion extending from a point furthest from a nearest cutting edge to a point intersecting said back wall of an adjacent scallop;
said point, at which said wall portion of each said trough intersects said back wall of an adjacent scallop, being disposed at a first distance from the nearest cutting edge;
said back wall of said adjacent scallop intersecting said back wall of another, adjoining scallop;
wherein a point at which said back wall of said adjacent scallop intersects said back wall of said other, adjoining scallop is located at a second distance from the nearest cutting edge;
said first distance being greater than or equal to said second distance.

17. The cutting insert according to claim 16, wherein a difference in elevation between said central plateau and said edge radius defines a height in a range between 0.08 mm to 0.12 mm.

18. The cutting insert according to claim 16, wherein said edge radius has a radius, R, in a range between 0.01 mm to 0.02 mm.

19. The cutting insert according to claim 8, wherein every point at which the back wall of each scallop intersects the back wall of an adjacent scallop is located at substantially the same distance from each cutting edge.

* * * * *